(12) United States Patent
Archer et al.

(10) Patent No.: US 7,796,527 B2
(45) Date of Patent: Sep. 14, 2010

(54) COMPUTER HARDWARE FAULT ADMINISTRATION

(75) Inventors: Charles J. Archer, Rochester, MN (US); Mark G. Megerian, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 11/279,579

(22) Filed: Apr. 13, 2006

(65) Prior Publication Data

US 2007/0260909 A1 Nov. 8, 2007

(51) Int. Cl.
- *H04J 3/14* (2006.01)
- *G06F 11/20* (2006.01)
- *G06F 11/10* (2006.01)
- *G06F 15/173* (2006.01)
- *H04L 12/28* (2006.01)

(52) U.S. Cl. ............... 370/242; 370/218; 370/408; 714/4; 709/224

(58) Field of Classification Search ......... 370/242, 370/241, 408, 216, 228, 238; 714/47, 1, 714/100, 242, 4
See application file for complete search history.

(56) References Cited

U.S. PATENT DOCUMENTS

| | | | |
|---|---|---|---|
| 4,245,344 A | 1/1981 | Richter | |
| 4,634,110 A | 1/1987 | Julich et al. | |
| 4,860,201 A | 8/1989 | Stolfo et al. | |
| 5,333,268 A | 7/1994 | Douglas et al. | |
| 5,918,005 A | 6/1999 | Moreno et al. | |
| 5,941,992 A * | 8/1999 | Croslin et al. | 714/4 |
| 5,953,347 A * | 9/1999 | Wong et al. | 370/469 |
| 5,953,530 A | 9/1999 | Rishi et al. | |
| 6,047,122 A | 4/2000 | Spiller | |
| 6,052,210 A * | 4/2000 | Nathan | 398/56 |
| 6,449,667 B1 | 9/2002 | Ganmukhi et al. | |
| 6,813,240 B1 * | 11/2004 | Shah | 370/228 |
| 6,848,062 B1 | 1/2005 | Desai et al. | |
| 6,880,100 B2 * | 4/2005 | Mora et al. | 714/4 |
| 6,892,329 B2 | 5/2005 | Bruckman | |
| 6,912,196 B1 * | 6/2005 | Mahalingaiah | 370/216 |
| 7,007,189 B2 | 2/2006 | Lee et al. | |
| 7,028,225 B2 | 4/2006 | Maso et al. | |
| 7,080,156 B2 | 7/2006 | Lee et al. | |

(Continued)

OTHER PUBLICATIONS

N R Adiga et al., "An Overview of the BlueGene/L Supercomputer," Supercomputing, ACM/IEEE 2002 Conference, Nov. 16-22, 2002, Piscataway, NJ.

(Continued)

*Primary Examiner*—Kwang B Yao
*Assistant Examiner*—Candal Elpenord
(74) *Attorney, Agent, or Firm*—Biggers & Ohanian, LLP

(57) ABSTRACT

Computer hardware fault administration carried out in a parallel computer, where the parallel computer includes a plurality of compute nodes. The compute nodes are coupled for data communications by at least two independent data communications networks, where each data communications network includes data communications links connected to the compute nodes. Typical embodiments carry out hardware fault administration by identifying a location of a defective link in the first data communications network of the parallel computer and routing communications data around the defective link through the second data communications network of the parallel computer.

15 Claims, 9 Drawing Sheets

U.S. PATENT DOCUMENTS

| | | | |
|---|---|---|---|
| 7,149,920 | B2 | 12/2006 | Blumrich et al. |
| 7,200,118 | B2 * | 4/2007 | Bender et al. ............... 370/242 |
| 7,210,088 | B2 | 4/2007 | Chen et al. |
| 7,289,428 | B2 * | 10/2007 | Chow et al. ................. 370/216 |
| 7,333,425 | B2 * | 2/2008 | Huck et al. ................. 370/217 |
| 7,382,734 | B2 | 6/2008 | Wakumoto et al. |
| 7,451,340 | B2 | 11/2008 | Doshi et al. |
| 7,461,236 | B1 | 12/2008 | Wentzlaff |
| 7,506,197 | B2 | 3/2009 | Archer et al. |
| 7,529,963 | B2 | 5/2009 | Archer et al. |
| 7,571,345 | B2 | 8/2009 | Archer et al. |
| 7,600,095 | B2 | 10/2009 | Archer et al. |
| 7,646,721 | B2 | 1/2010 | Archer et al. |
| 7,669,075 | B2 | 2/2010 | Archer et al. |
| 2002/0152432 | A1 * | 10/2002 | Fleming ..................... 714/47 |
| 2002/0188930 | A1 | 12/2002 | Moser et al. |
| 2003/0061265 | A1 | 3/2003 | Maso et al. |
| 2004/0078493 | A1 | 4/2004 | Blumrich et al. |
| 2004/0103218 | A1 | 5/2004 | Blumrich et al. |
| 2004/0181707 | A1 * | 9/2004 | Fujibayashi ................... 714/6 |
| 2004/0205237 | A1 | 10/2004 | Doshi et al. |
| 2004/0223463 | A1 | 11/2004 | MacKiewich et al. |
| 2005/0120273 | A1 | 6/2005 | Hudson et al. |
| 2005/0131865 | A1 | 6/2005 | Jones et al. |
| 2005/0246569 | A1 | 11/2005 | Ballew et al. |
| 2005/0259587 | A1 | 11/2005 | Wakumoto et al. |
| 2006/0179269 | A1 | 8/2006 | Archer et al. |
| 2007/0174558 | A1 | 7/2007 | Jia et al. |
| 2007/0245122 | A1 | 10/2007 | Archer et al. |
| 2008/0253386 | A1 | 10/2008 | Barum |
| 2008/0263320 | A1 | 10/2008 | Archer et al. |
| 2008/0263329 | A1 | 10/2008 | Archer et al. |
| 2008/0263387 | A1 | 10/2008 | Darrington et al. |
| 2008/0270998 | A1 | 10/2008 | Zambrana |
| 2008/0313506 | A1 | 12/2008 | Archer et al. |
| 2009/0016332 | A1 | 1/2009 | Aoki et al. |

OTHER PUBLICATIONS

Office Action Dated Nov. 12, 2008 in U.S. Appl. No. 11/279,573.
Office Action Dated Apr. 15, 2009 in U.S. Appl. No. 11/279,573.
Office Action Dated Nov. 12, 2008 in U.S. Appl. No. 11/279,579.
Office Action Dated Apr. 15, 2009 in U.S. Appl. No. 11/279,579.
Office Action Dated Jan. 9, 2009 in U.S. Appl. No. 11/279,586.
Office Action Dated Nov. 18, 2008 in U.S. Appl. No. 11/279,592.
Office Action Dated Apr. 29, 2009 in U.S. Appl. No. 11/279,592.
Office Action Dated Apr. 15, 2009 in U.S. Appl. No. 11/279,573.
Office Action Dated Nov. 12, 2008 in U.S. Appl. No. 11/279,573.
U.S. Appl. No. 11/279,573, filed Oct. 18, 2007. Archer, et al.
U.S. Appl. No. 11/360,346, filed Oct. 4, 2007, Gooding, et al.
U.S. Appl. No. 11/279,579, filed Nov. 8, 2007, Archer, et al.
U.S. Appl. No. 11/279,586, filed Oct. 18, 2007, Archer, et al.
U.S. Appl. No. 11/279,592, filed Oct. 18, 2007, Archer.
U.S. Appl. No. 11/737,229, filed Oct. 23, 2008, Archer, et al.
U.S. Appl. No. 11/832,940, filed Feb. 5, 2009, Archer, et al.
Final Office Action Dated Oct. 28, 2009 in U.S. Appl. No. 11/279,573.
Final Office Action Dated Sep. 4, 2009, in U.S. Appl. No. 11/279,579.
Notice of Allowance Dated Nov. 2, 2009, in U.S. Appl. No. 11/279,592.
Office Action Dated Mar. 8, 2010 in U.S. Appl. No. 11/360,346.
Notice of Allowance Dated Jun. 30, 2009 in U.S. Appl. No. 11/279,586.
Office Action Dated Mar. 29, 2010, in U.S. Appl. No. 11/832,940.
Stallman, Richard M. GDB Manual—The GNU Source-Level Debugger. [online] (Oct. 1989). Free Software Foundation, Inc., pp. 1-78. Retrieved From the Internet <http://www.cs.cmu.edu/afs/cs/usr/bovik/OldFiles/vax_u13/omega/usr/mach/doc/gdb.ps>.

* cited by examiner

COMPUTER HARDWARE FAULT ADMINISTRATION

GOVERNMENT RIGHTS IN INVENTION

The U.S. Government has a paid-up license in this invention and the right in limited circumstances to require the patent owner to license others on reasonable terms as provided for by the terms of Contract No. B519700 awarded by the Department of Energy.

BACKGROUND OF THE INVENTION

1. Field of the Invention

The field of the invention is data processing, or, more specifically, methods, systems, and products for computer hardware fault administration in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero or one child, depending on the hardware configuration). In computers that use a torus and a tree network, the two networks typically are implemented independently of one another, with separate routing circuits, separate physical links, and separate message buffers.

A torus network lends itself to point to point geometrically aware diagnostics, but a tree network typically is inefficient in point to point communication. A tree network, however, does provide high bandwidth and low latency for certain collective operations, message passing operations where all compute nodes participate simultaneously. Because thousands of nodes may participate in a point to point as well as collective operations on a parallel computer, hardware fault administration in such computers is difficult.

SUMMARY OF THE INVENTION

Methods, apparatus, and computer program products are disclosed for computer hardware fault administration carried out in a parallel computer, where the parallel computer includes a plurality of compute nodes. The compute nodes are coupled for data communications by at least two independent data communications networks, where each data communications network includes data communications links connected to the compute nodes. Typical embodiments carry out hardware fault administration by identifying a location of a defective link in the first data communications network of the parallel computer and routing communications data around the defective link through the second data communications network of the parallel computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
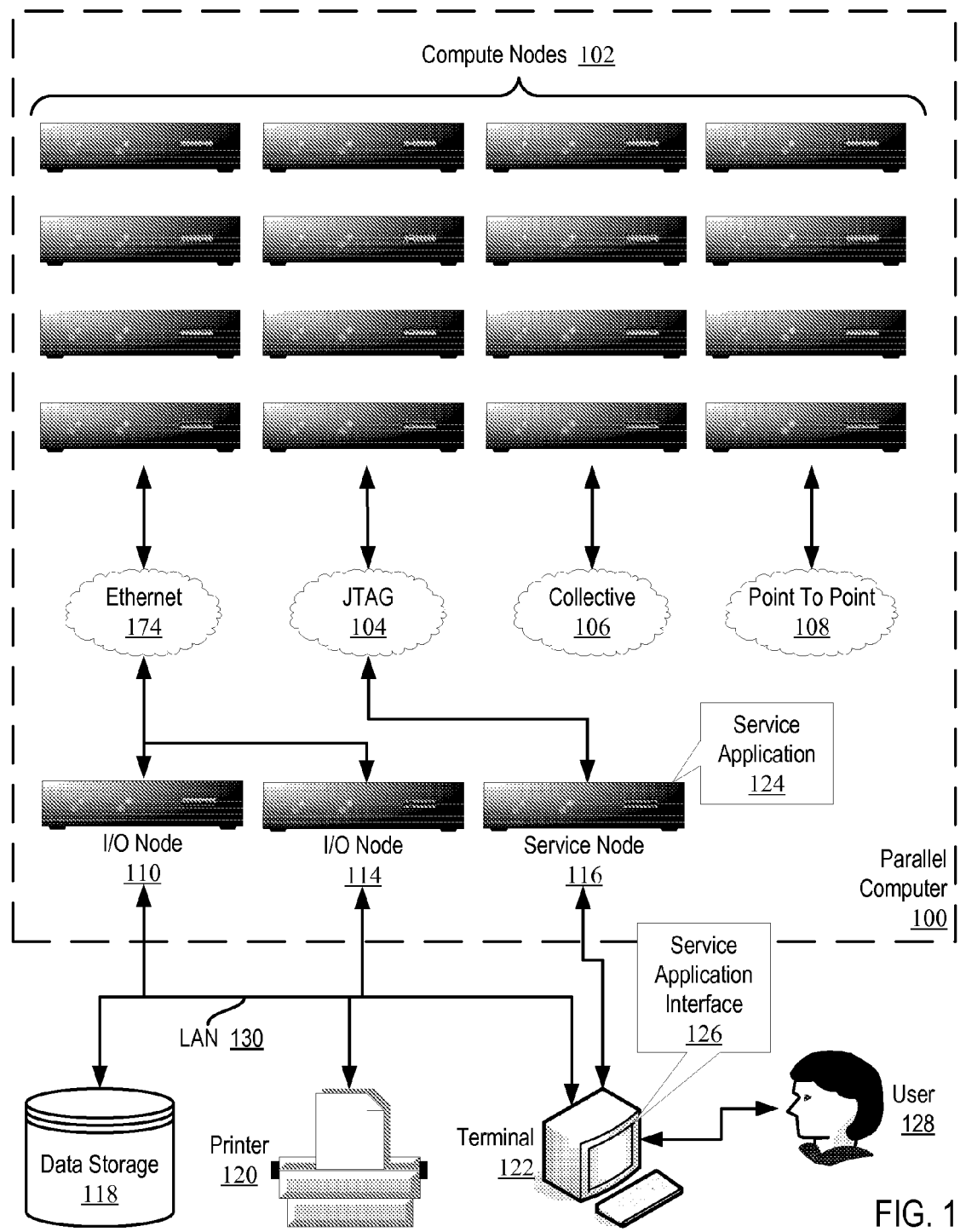
FIG. 1 illustrates an exemplary system for computer hardware fault administration according to embodiments of the present invention.

Exemplary methods, apparatus, and computer program products for computer hardware fault administration according to embodiments of the present invention are described with reference to the accompanying drawings, beginning with FIG. 1. FIG. 1 illustrates an exemplary system for computer hardware fault administration according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a collective operations network (106), and a point to point operations network (108). As described in more detail below, each data communications network is implemented with data communications links among the compute nodes (102). Also as described in more detail below in this specification, the system of FIG. 1 operates generally to carry out computer hardware fault administration according to embodiments of the present invention by identifying a location of a defective link in a first data communications network of a parallel computer and routing communications data around the defective link through a second data communications network of the parallel computer.

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

Routing communications around a defective link may be part of a point to point operation or a collective operation, and the second network through which communications data is routed around a defective link may or may not be optimized for the operation in effect when the routing around occurs. If routing around a defective link occurs as part of a point to point operation in a network optimized for point to point operations, such as, for example, a torus, then the second network through which a data packet is routed around a defective link may be a network that is optimized for collective operations rather than point to point operations, such as, for example, a collective tree network. If routing around a defective link occurs as part of a collective operation in a network optimized for collective operations, such as, for example, a tree network, then the second network through which a data packet is routed around a defective link may be a network that is optimized for point to point rather than collective operations, such as, for example, a torus network.

A collective operation is an operation, a message-passing computer program instruction, that is executed simultaneously, that is, at approximately the same time, by all the compute nodes in a 'plurality' or 'group' of compute nodes. Such a plurality or group of compute nodes may include all the compute nodes in the parallel computer (100) or a subset all the compute nodes. In MPI terminology, such a 'plurality' or 'group' may be defined as a 'communicator.'

'MPI' refers to 'Message Passing Interface,' a prior art parallel communications library, a module of computer program instructions for data communications on parallel computers. Examples of prior-art parallel communications libraries that may be improved for hardware fault administration according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Collective operations are composed of many point to point messages executed more or less concurrently (depending on the operation and the internal algorithm) and involve all processes running in a given group of compute nodes, that is, in a given MPI communicator. Every process on every compute node in the group must call or execute the same collective operation at approximately the same time. The required simultaneity is described as approximate because many processes running on many separate, physical compute node cannot be said to do anything all together at exactly the same time. Parallel communications libraries provide functions to support synchronization. In the MPI example, such a synchronization function is a 'barrier' routine. To synchronize, all processes on all compute nodes in a group call MPI_barrier( ), for example, and then all processes wait until all processes reach the same point in execution. Then execution continues, with substantial synchronization.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gather from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffer to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

The arrangement of nodes, networks, and I/O devices making up the exemplary system illustrated in FIG. 1 are for explanation only, not for limitation of the present invention. Data processing systems that implement hardware fault administration according to various embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers implementing hardware fault administration according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Computer hardware fault administration according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in compute hardware fault administration according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node.

Stored in RAM (156) is an application program (158), a module of computer program instructions, including instructions for collective operations, that carries out parallel, user-level data processing using parallel algorithms. Application program (158) contains computer program instructions that operate, along with other programs on other compute nodes in a parallel computer, to carry out computer hardware fault administration according to embodiments of the present invention by executing a collective operation through a first data communications network upon a plurality of the compute nodes of the computer, executing the same collective operation through a second data communications network upon the same plurality of the compute nodes of the computer, and comparing results of the collective operations.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in hardware fault administration according to embodiments of the present invention, using a traditional programming language such as the C programming language, and using traditional programming methods to write parallel communications routines that send and receive data among nodes on two independent data communications networks. Alternatively, existing prior art libraries may be used. Examples of prior-art parallel communications libraries that may be improved for hardware fault administration according to embodiments of the present invention include the 'Message Passing Interface' ('MPI') library and the 'Parallel Virtual Machine' ('PVM') library. However it is developed, the parallel communications routines of parallel communication library (160) are improved to carry out computer hardware fault administration according to embodiments of the present invention by identifying a location of a defective link in a first data communications network of a parallel computer and routing communications data around the defective link through a second data communications network of the parallel computer.

Also stored in RAM (168) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
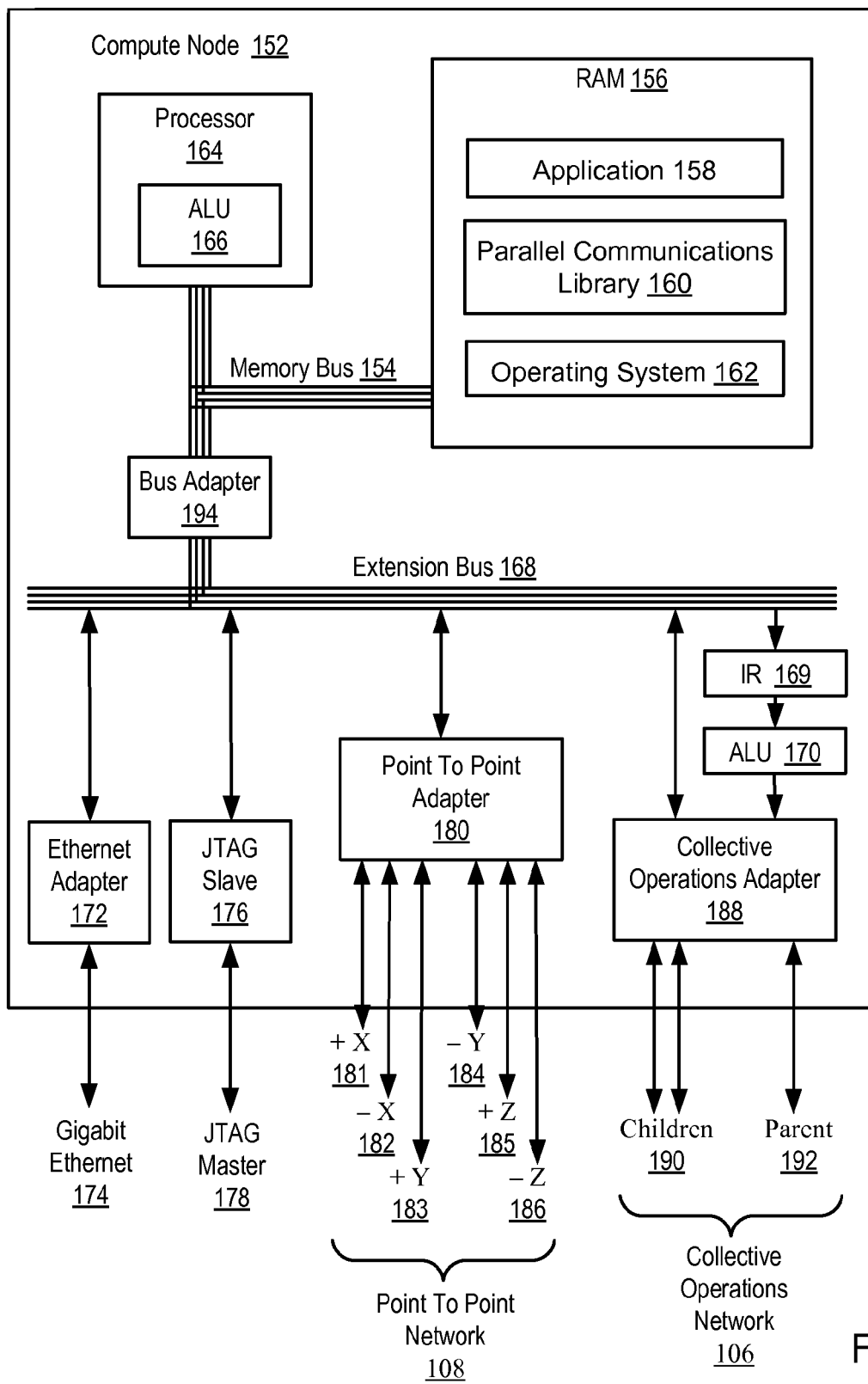
FIG. 2 sets forth a block diagram of an exemplary compute node useful in compute hardware fault administration according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that administer hardware faults according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in administration of hardware faults according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to child nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Figure 3A:
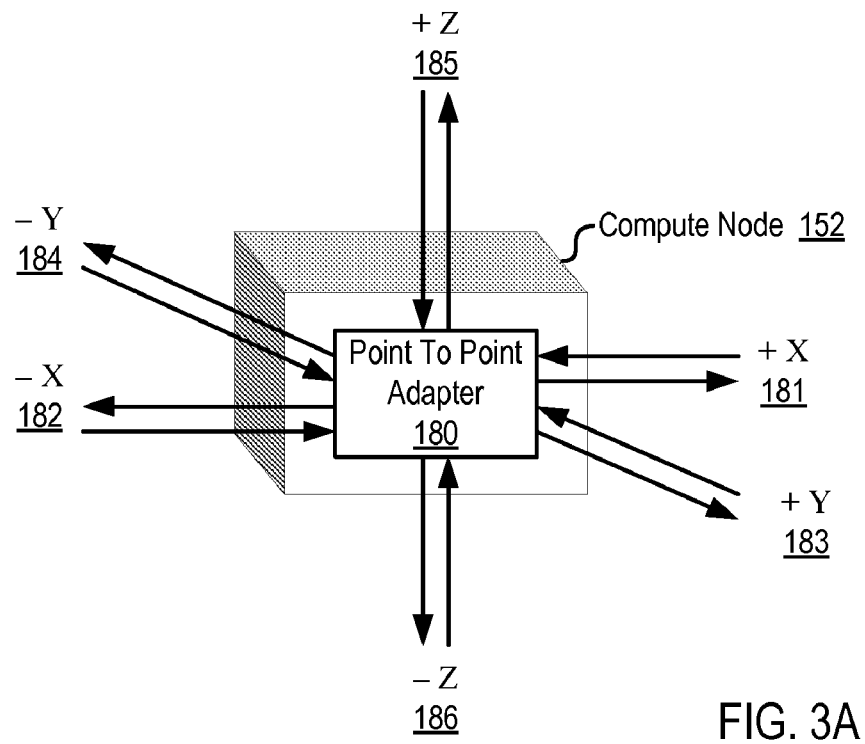
FIG. 3A illustrates an exemplary Point To Point Adapter useful in systems that administer hardware faults according to embodiments of the present invention.

For further explanation, FIG. 3A illustrates an exemplary Point To Point Adapter (180) useful in systems that administer hardware faults according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
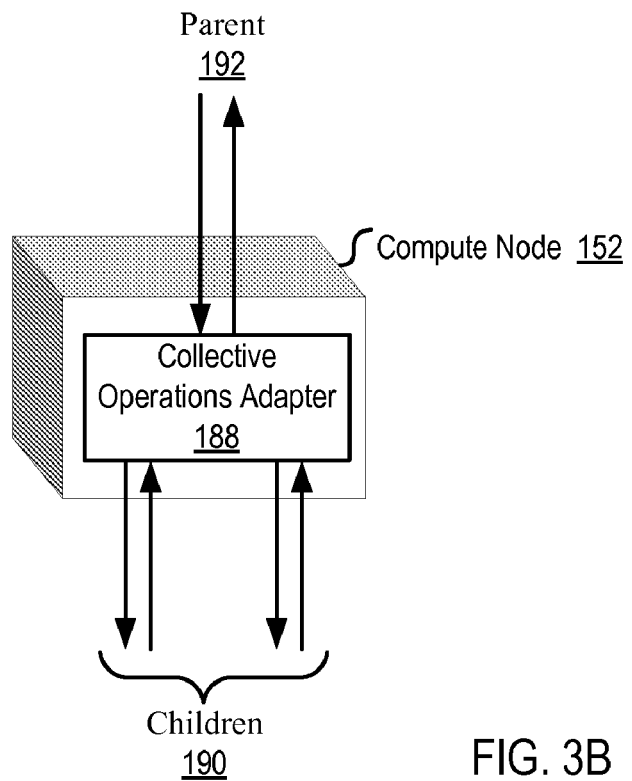
FIG. 3B illustrates an exemplary Collective Operations Adapter useful in systems that administer hardware faults according to embodiments of the present invention.

For further explanation, FIG. 3B illustrates an exemplary Collective Operations Adapter (188) useful in systems that administer hardware faults according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
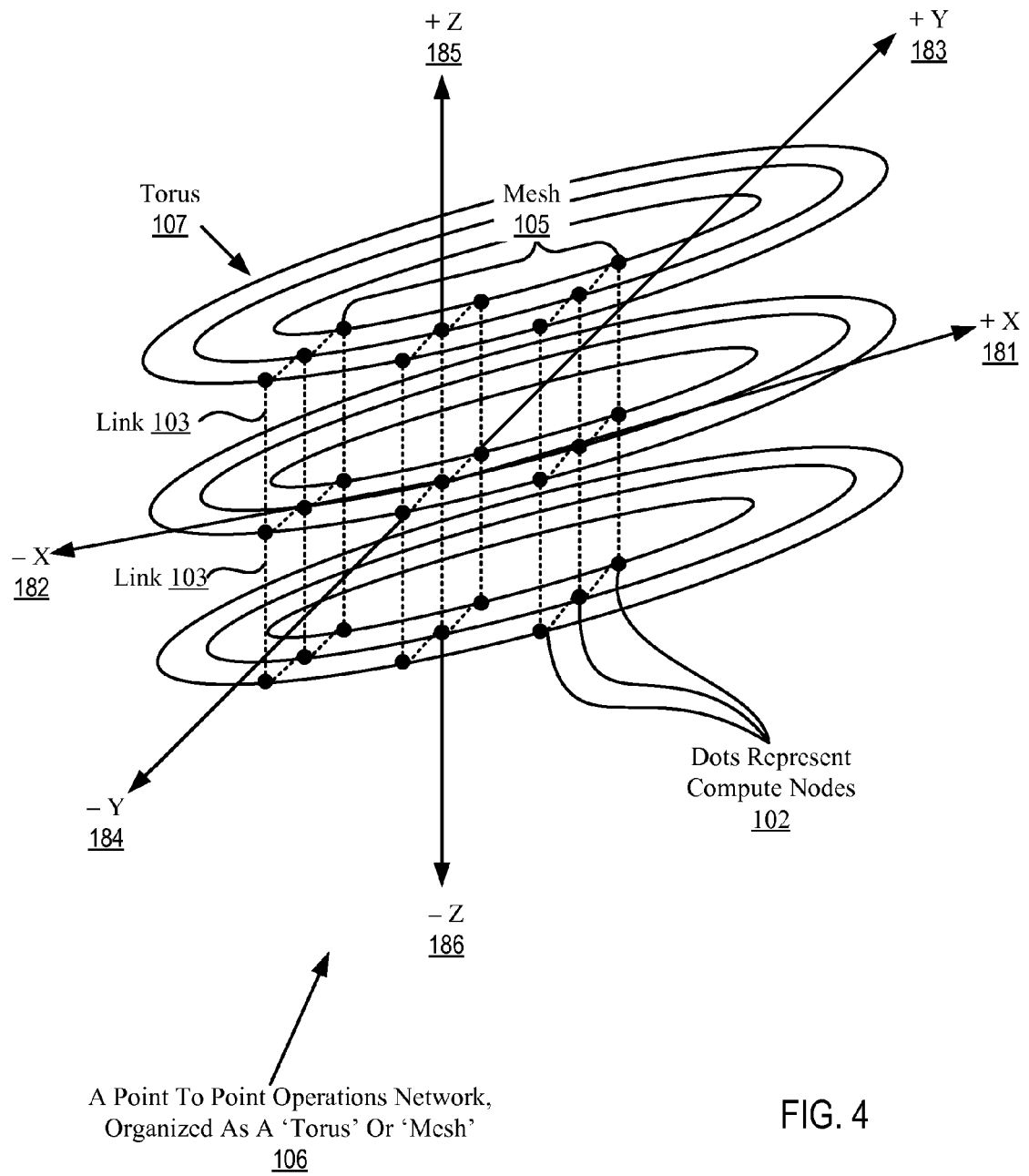
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in administration of computer hardware faults in accordance with embodiments of the present invention may contain only a few compute nodes or may contain thousands of compute nodes.

Figure 5:
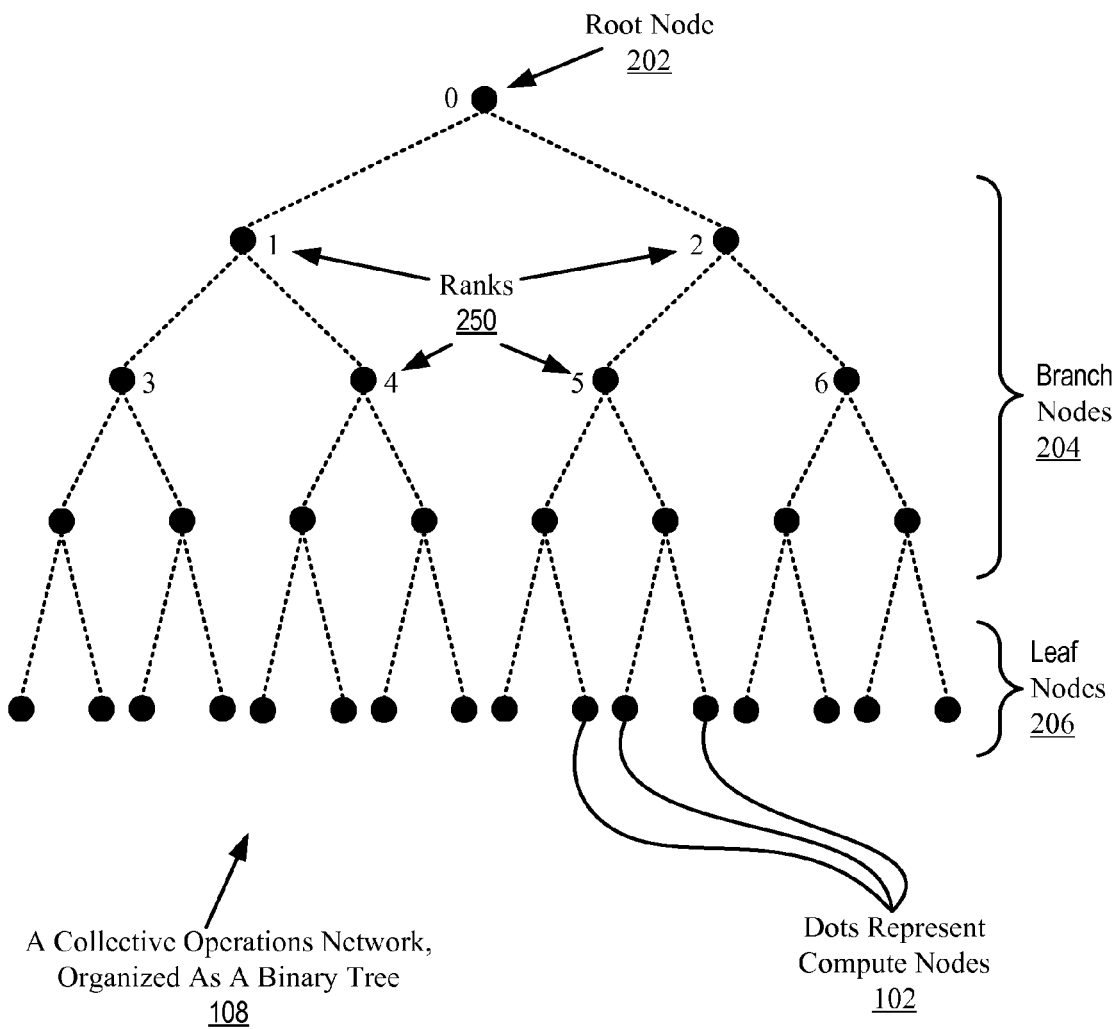
FIG. 5 illustrates an exemplary data communications network optimized for collective operations.

For further explanation, FIG. 5 illustrates an exemplary data communications network optimized for collective operations (108). In the example of FIG. 5, dots represent compute nodes (102) of a parallel computer, and the dotted lines between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in administration of computer hardware faults in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all nodes in the tree are assigned a unique rank.

Figure 6:
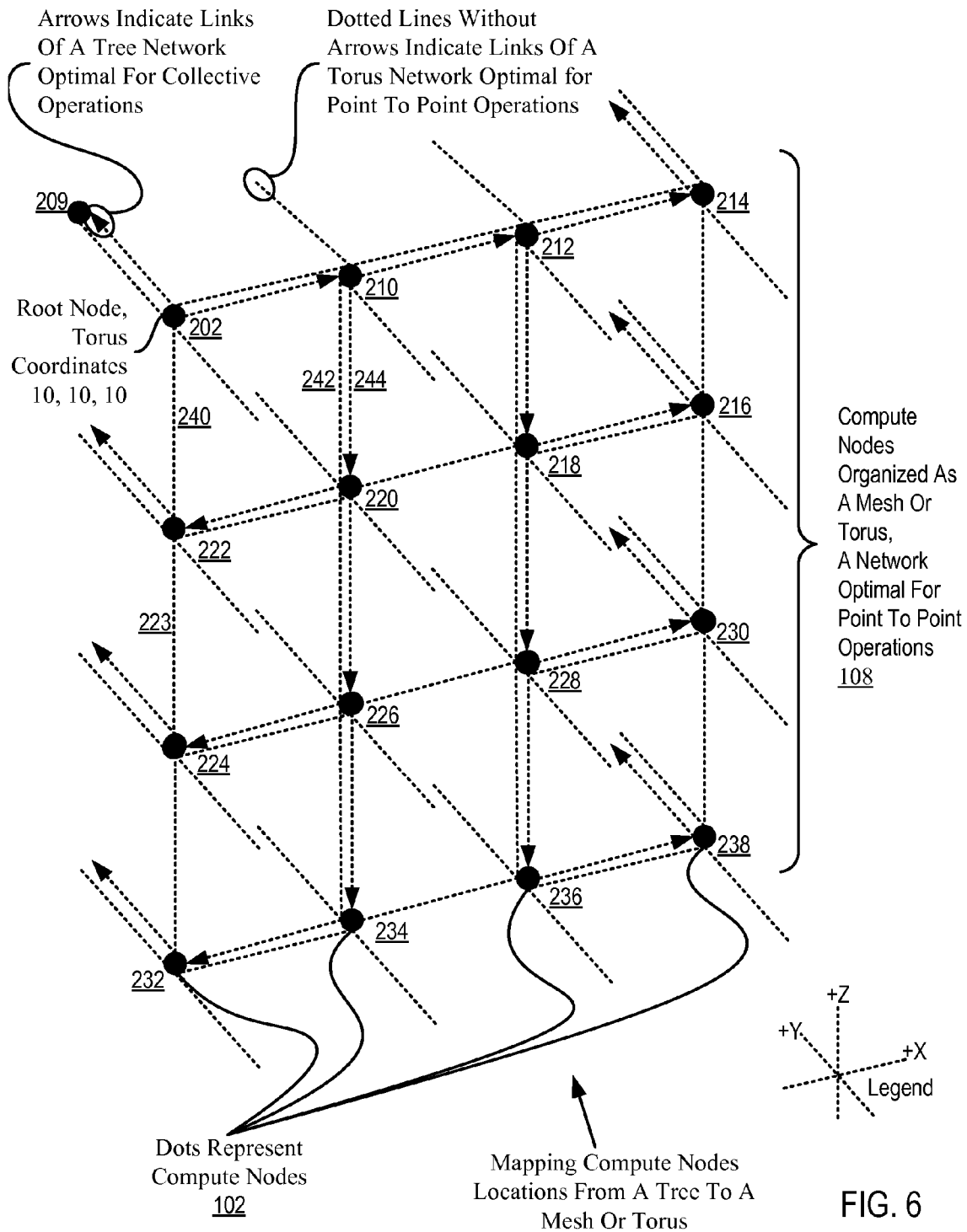
FIG. 6 illustrates a mapping of compute node locations between a tree network and a torus network.

In routing data communications through a second network around a defective link in a first network, it is useful to be able to identify locations of a compute node in both networks. Such networks typically operate independently of one another. For further explanation, therefore, FIG. 6 illustrates a mapping of compute node locations between a tree network and a torus network. Dots (102) in FIG. 6 represent compute nodes.

Each compute node is coupled into two networks for data communications among compute nodes: a network that organizes the compute nodes in a torus and network that organizes the compute nodes in a tree. Plain dotted lines between compute nodes in FIG. 6 represent data communications links between nodes in a torus network. Compute node (202) is linked, for example, in the −Y direction to compute node (209), in the +X direction to compute node (210), and in the −Z direction to compute node (222). Each compute node has a location in the torus that is uniquely specified by a set of x, y, z coordinates. Dotted lines with arrowheads in FIG. 6 represent data communications links among the same compute nodes in a tree network. Taking compute node (202) as the root of the tree, for example, compute node (202) has children (209, 210), grandchildren (220, 212), great-grandchildren (222, 226, 218, 214), and so on. Each compute node has a location in the tree that is uniquely specified by a rank value.

TABLE 1

| Compute Node | Rank In Tree Network | Coordinates In Torus |
|---|---|---|
| 202 | 0 | 10, 10, 10 |
| 209 | 1 | 10, 9, 10 |
| 210 | 2 | 11, 10, 10 |
| — | 3-4 | — |
| 220 | 5 | 11, 10, 9 |
| 212 | 6 | 12, 10, 10 |
| — | 7-10 | — |
| 222 | 11 | 10, 10, 9 |
| 226 | 12 | 11, 10, 8 |
| 218 | 13 | 12, 10, 9 |
| 214 | 14 | 13, 10, 10 |

Table 1 further illustrates the mapping of compute node locations between the torus and the tree networks. Compute node (202) is assigned the root position in the tree with tree rank 0 torus coordinates 10, 10, 10. The compute nodes at ranks 3, 4, and 7-10 are children and grandchildren of compute node (209), not shown on FIG. 6. Mappings for the remaining nodes of ranks 0-14 are described in Table 1, where each record in the table represents a mapping for a compute node of the compute node's tree rank to the compute node's torus coordinates.)

Compute node (209) has tree rank 1, mapped to torus coordinates 10, 9, 10 because compute node (209) is located in the torus network at Y−1 with respect to compute node (202). Compute node (210) has tree rank 2, mapped to torus coordinates 11, 10, because compute node (210) is located in the torus network at X+1 with respect to compute node (202). Compute node (220) has tree rank 5, mapped to torus coordinates 11, 10, 9 because compute node (220) is located in the torus network at Z−1 with respect to compute node (210). Compute node (212) has tree rank 6, mapped to torus coordinates 12, 10, 10 because compute node (212) is located in the torus network at X+1 with respect to compute node (210). Compute node (209) has tree rank 1, mapped to torus coordinates 10, 9, 10 because compute node (209) is located in the torus network at Y−1 with respect to compute node (202). And so on. In this way, a few or thousands upon thousands of compute node locations may be mapped from one network to another, from a tree network to a torus network, or from a torus network to a tree network.

Figure 7:
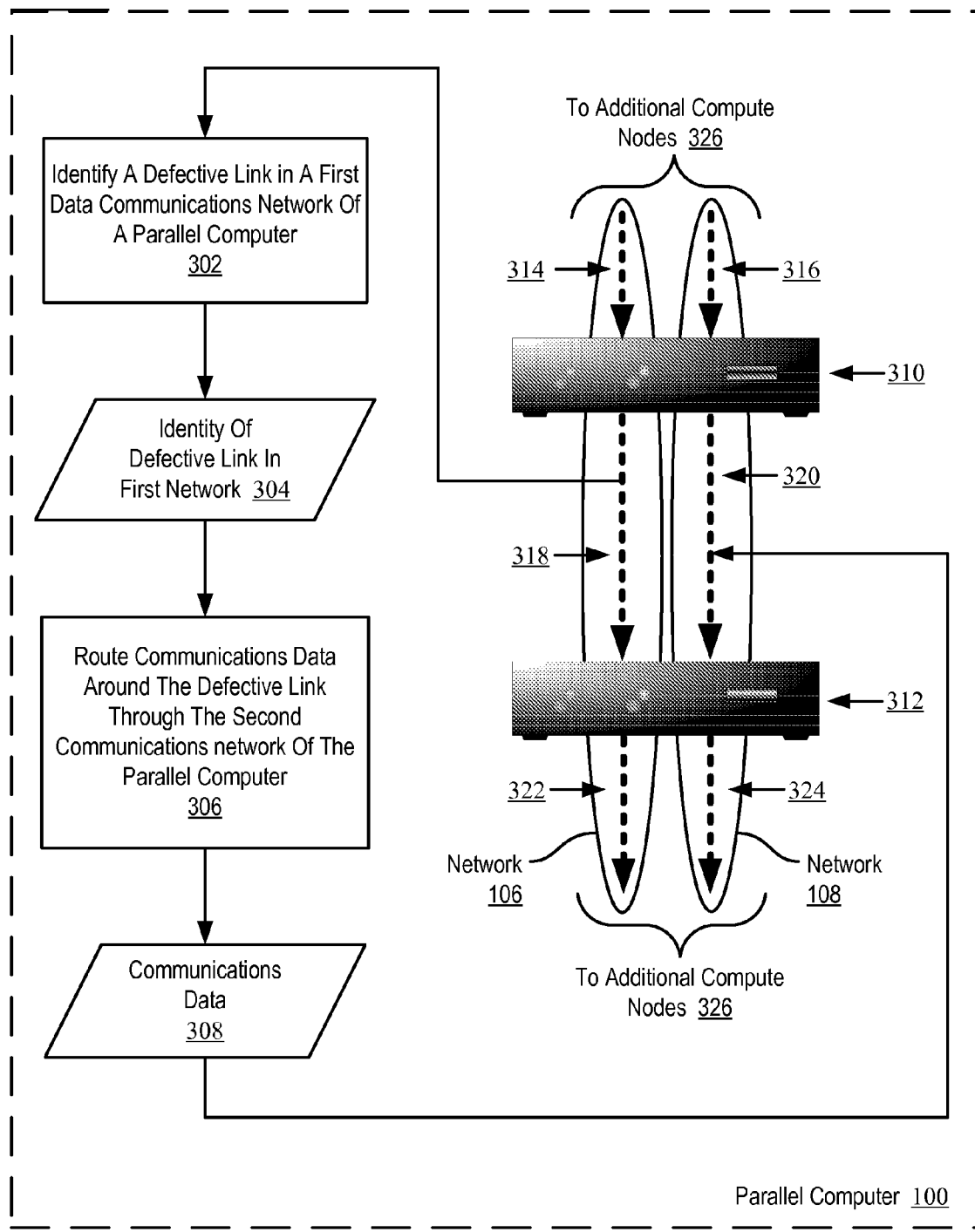
FIG. 7 sets forth a flow chart illustrating a further exemplary method of computer hardware fault administration according to embodiments of the present invention.

For further explanation, FIG. 7 sets forth a flow chart illustrating an exemplary method of computer hardware fault administration according to embodiments of the present invention. The method is carried out in a parallel computer (100) that includes a plurality of compute nodes (310, 312, 326). The compute nodes are coupled for data communications by at least two independent data communications networks, a first data communications network (106) and a second data communications network (108). The first data communications network (106) may be a network that is optimal for collective operations, such as, for example, the network illustrated and described above with reference to FIG. 4. The first data communications network (106) may be a network that organizes the compute nodes (102) as a tree, such as, for example, the network illustrated and described above with reference to FIG. 4. The second data communications (108) may be a network that is optimal for point to point operations, such as, for example, the network illustrated and described above with reference to FIG. 5. The second data communications network (108) may be a network that organizes the compute nodes as a torus, such as, for example, the network illustrated and described above with reference to FIG. 5. Each data communications network includes data communications links (314, 316, 318, 320, 322, 324) connected to the compute nodes. Data communications links in this example represent physical hardware communications connections between compute nodes.

The method of FIG. 7 includes identifying (302) a location of a defective link (314) in the first data communications network (106) of the parallel computer. If the first network is a tree network, the location of a defective link may be identified by a rank of a compute node to which the defective link is attached and a specification whether the defective link is inbound or outbound to or from a parent, a first child, or a second child of the compute node. If the first network is a torus, the location of a defective link may be identified by x, y, z coordinates of a compute node to which the defective link is attached and a specification whether the defective link is inbound or outbound in a direction, +X, −X, +Y, −Y, +Z, or −Z.

The method of FIG. 7 also includes routing (306) communications data (308) around the defective link (314) through the second data communications network (108) of the parallel computer. If the first network is a tree network, for example, and the second network is a torus, routing (306) communications data (308) around the defective link (314) may be carried out by routing tree network communications data through one or more links of the torus network to route around the defective link. If the first network is a torus and the second network is a tree, routing (306) communications data (308) around the defective link (314) may be carried out by routing torus network communications data through one or more links of the tree network to route around the defective link.

If a network has only a few defective links known from diagnostic runs, for example, on either a torus or tree, such links can be identified before job launch, and equivalent overlapped redundant network links can be used during program execution. This allows the rest of the system (possibly thousands of nodes) to continue using both the torus and tree network, while only the nodes connected by the defective links will risk performance degradation. Moreover, the risk of performance degradation by routing around a defective link through another network, although present, is not absolute. Collective operations links may be faster than point to point links, for example, so that routing around a defective point to point link through a single collective link may actually present no performance degradation at all.

Figure 8:
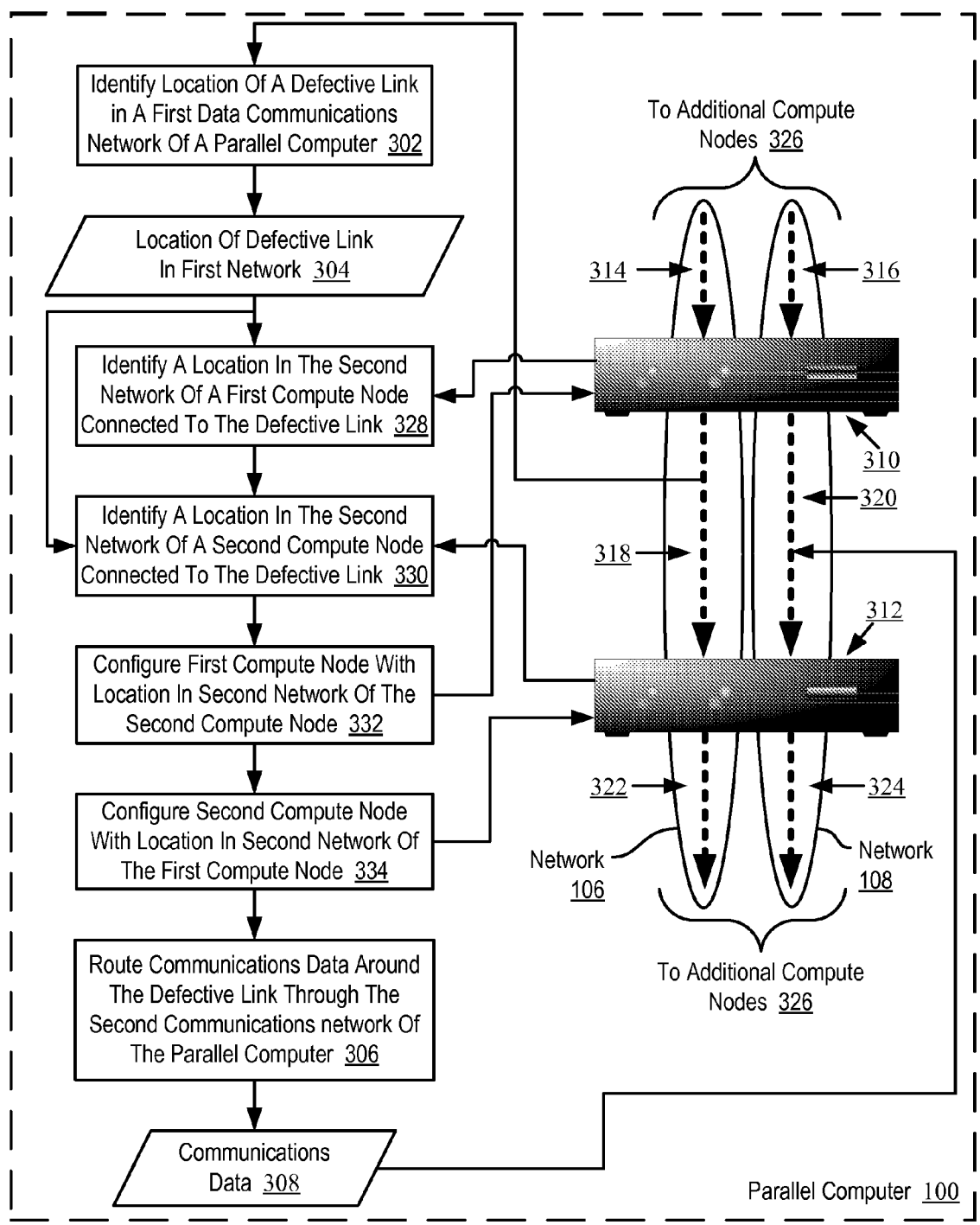
FIG. 8 sets forth a flow chart illustrating a further exemplary method of computer hardware fault administration according to embodiments of the present invention.

On the other hand, there may be no single-link replace in a collective network for a point to point link. Torus nodes have links in six directions (+X, −X, +Y, −Y, +Z, −Z); tree nodes in only three (to a parent and to two children). Not every torus link has a parallel tree link. Consider the point to point Z-direction torus link (223) between compute nodes (222, 224) in the example of FIG. 6. There is no parallel tree link between compute nodes (222, 224). If link (223) is defective, routing data around it means routing data through compute nodes (220, 226), through a total of three operational links to route around one defective link. The same statement is not true of tree links. Every tree link has a parallel torus link. For further explanation, FIG. 8 sets forth a flow chart illustrating a further exemplary method of computer hardware fault administration according to embodiments of the present invention. Like the method of FIG. 7, The method of FIG. 8 is carried out in a parallel computer (100) that includes a plurality of compute nodes (310, 312, 326). The compute nodes are coupled for data communications by at least two independent data communications networks, a first data communications network (106) and a second data communications network (108). The first data communications network (106) may be a network that is optimal for collective operations, such as, for example, the network illustrated and described above with reference to FIG. 4. The first data communications network (106) may be a network that organizes the compute nodes (102) as a tree, such as, for example, the network illustrated and described above with reference to FIG. 4. The second data communications (108) may be a network that is optimal for point to point operations, such as, for example, the network illustrated and described above with reference to FIG. 5. The second data communications network (108) may be a network that organizes the compute nodes as a torus, such as, for example, the network illustrated and described above with reference to FIG. 5. Each data communications network includes data communications links (314, 316, 318, 320, 322, 324) connected to the compute nodes. Data communications links in this example represent physical hardware communications connections between compute nodes.

Also like the method of FIG. 7, the method of FIG. 8 includes identifying (302) a location of a defective link (314) in the first data communications network (106) of the parallel computer and routing (306) communications data (308) around the defective link (314) through the second data communications network (108) of the parallel computer.

In addition, however, the method of FIG. 8 also includes identifying (328), in dependence upon the location (304) of the defective link (318) in the first network (106), a location in the second network (108) of a first compute node (310) connected to the defective link (318). If the first network is a torus and the second network a tree, for example, then given the torus coordinate location of a first compute node connected to the defective link, the location of the first compute node in the second network, its rank in the tree, may be identified by looking it up in a mapping table such as, for example, the mapping illustrated above in FIG. 1.

The method of FIG. 8 also includes identifying (330), in dependence upon the location (304) of the defective link (318) in the first network (106), a location in the second network (108) of a second compute node (312) connected to the defective link (318). If the first network is a torus and the second network a tree, for example, then given the torus coordinate location of a second compute node connected to the defective link, the location of the second compute node in the second network, it rank in the tree, may be identified by looking it up in a mapping table such as, for example, the mapping illustrated above in FIG. 1.

The method of FIG. 8 also includes configuring (332) the first compute node (310) with the location in the second network (108) of the second compute node (312). Continuing the example where the first network is a torus and the second network a tree: configuring (332) the first compute node (310) with the location in the second network (108) of the second compute node (312) means configuring the first compute node with the rank in the tree network of the second compute node connected to the defective link. Referring to FIG. 1: Service application (124) may be programmed to accept user input in the form of typed-in configuration data from user (128) through service application interface (126) on computer terminal (122) and configure the first compute node (310) with the location in the second network (108) of the second compute node (312). The configuration may be implemented as configuration data stored in a mapping table local to the first compute node, such as, for example, Send Map Table (902) on FIG. 9.

The method of FIG. 8 also includes configuring (334) the second compute node (312) with the location in the second network (108) of the first compute node (310). Again with the example where the first network is a torus and the second network a tree: configuring (334) the second compute node (312) with the location in the second network (108) of the first compute node (310) means configuring the second compute node with the rank in the tree network of the first compute node connected to the defective link. Again with reference to FIG. 1: Service application (124) may be programmed to accept user input in the form of typed-in configuration data from user (128) through service application interface (126) on computer terminal (122) and configure the second compute node (312) with the location in the second network (108) of the first compute node (310). The configuration may be implemented as configuration data stored in a mapping table local to the second compute node, such as, for example, Send Map Table (912) on FIG. 9.

Figure 9:
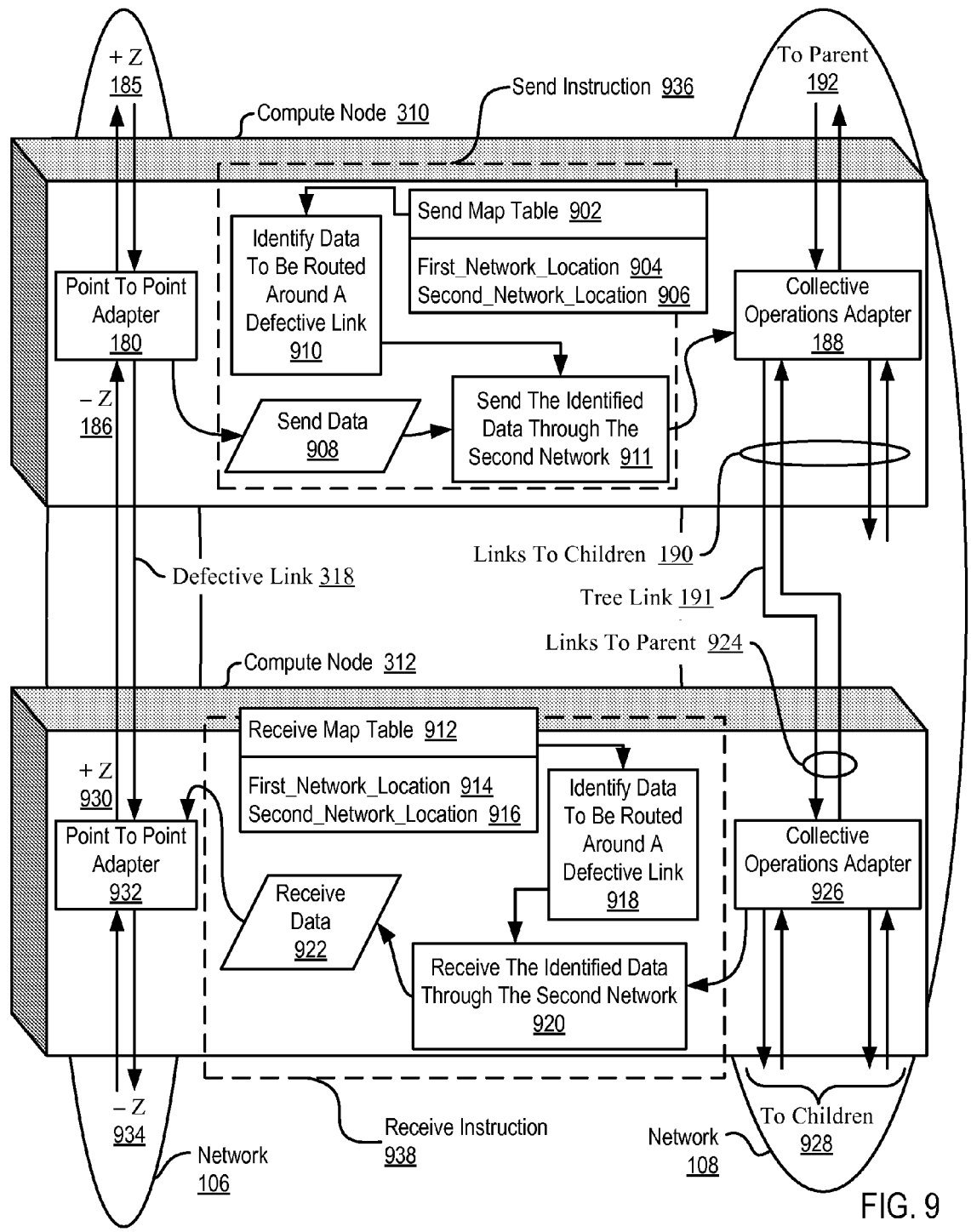
FIG. 9 sets forth a flow chart illustrating an exemplary method of routing communications data around a defective link through a second data communications network.

For further explanation, FIG. 9 sets forth a flow chart illustrating an exemplary method of routing communications data around a defective link through a second data communications network. The method is carried out in a parallel computer that includes a plurality of compute nodes (310, 312). The compute nodes are coupled for data communications by at least two independent data communications networks, a first data communications network (106) and a second data communications network (108). The second data communications network (108) in this example is represented as a network that is optimal for collective operations, such as, for example, the network illustrated and described above with reference to FIG. 4. The second data communications network (108) in this example is a network that organizes compute as a tree, such as, for example, the network illustrated and described above with reference to FIG. 4. The first data communications (108) is represented in this example as a network that is optimal for point to point operations, such as, for example, the network illustrated and described above with reference to FIG. 5. The first data communications network (108) in this example is a network that organizes compute nodes as a torus, such as, for example, the network illustrated and described above with reference to FIG. 5.

Each data communications network in this example includes data communications links (314, 316, 318, 320, 322, 324) connected to the compute nodes. Data communications links in this example represent physical hardware communications connections between compute nodes. Collective network links include links (190) from compute node (310) to its children, one of whom is compute node (312). Collective network links include links (924) from compute node (312) to its parent node (310). Point to point link in this example include links (186) in the −Z direction from compute node (310) and links (930) in the +Z direction from compute node (312), which represent the same physical data communications connection between compute nodes (310, 312). For clarity of explanation, X and Y point to point links are not shown in FIG. 9. Data communications link (318) in this example is a defective link.

In the method of FIG. 9, a first compute node (310) connected to the defective link (318) is configured (902) with a location (906) in the second network of a second compute node (312) connected to the defective link. The configuration is implemented as configuration data stored in a mapping table local to the first compute node, Send Map Table (902). Each record of Send Map Table (902) has a First_Network_Location field (904) in which is stored the torus coordinates of a second compute node (312) connected to the defective link. Each record of Send Map Table (902) has a Second_Network_Location field (906) in which is stored the tree rank in the tree network (108) of the second compute node (312) connected to the defective link.

In the method of FIG. 9 routing communications data around the defective link through a second data communications network includes identifying (910) by the first compute node (310) communications data (908) to be sent to the second compute node (312) as communications data to be routed around the defective link (318). In this example, the step of identifying (910) communications data (908) as communications data to be routed around the defective link (318) is part of a send instruction (936) in a parallel communications library, such as, for example, this send instruction:

send(buffer, count, datatype, destination, . . . .

This is an example of a send instruction that sends count elements of data of type 'datatype' from a send 'buffer' to a 'destination.' The 'buffer' parameter is a pointer to the buffer. The 'destination' parameter may be a set of x,y,z torus coordinates for a destination compute node (for data communications through a torus network) or a tree rank of a destination compute node (for data communications through a tree network).

In executing such a send instruction (936), therefore, compute node (310) may identify (910) communications data (908) as communications data to be routed around the defective link (318) by looking up the destination in Send Map Table (902). If a record exists in Send Map Table (902) having a First_Network_Location (904) value, a set of torus coordinates, equal to the destination of a particular send instruction, then that send instruction is an instruction to send communications data across a defective link. The same record of the Send Map Table (902) also contains a Second_Network_Location (906) in which is stored the corresponding tree rank in the tree network (108) of the destination compute node.

In the method of FIG. 9 routing communications data around the defective link through a second data communications network also includes sending (911) by the first compute node (310) the identified communications data (908) through the second data communications network (108) to the location of the second compute node (312) in the second data communications network. In this example, sending (911) by the first compute node (310) the identified communications data (908) through the second data communications network (108) to the location of the second compute node (312) in the second data communications network is carried out by sending the communications data (908), whose destination is the torus coordinates of compute node (312) through defective link (318), to the tree rank of compute node (312) through collective operations adapter (188), (non-defective) tree link (191), and collective operations adapter (926) of tree network (108).

Also in the example of FIG. 9, a second compute node (312) connected to the defective link (318) is configured (912) with a location (916) in the second network of a first compute node (310) connected to the defective link (318). The configuration is implemented as configuration data stored in a mapping table local to the first compute node, Receive Map Table (912). Each record of Receive Map Table (912) has a First_Network_Location field (914) in which is stored the torus coordinates of a first compute node (310) connected to the defective link. Each record of Receive Map Table (912) has a Second_Network_Location field (916) in which is stored the tree rank in the tree network (108) of the first compute node (310) connected to the defective link.

In the method of FIG. 9 routing communications data around the defective link through a second data communications network also includes identifying (918) by the second compute node (312) communication data (922) to be received from the first compute node (310) as communications data to be routed around the defective link. In this example, the step of identifying (918) by the second compute node (312) communication data (922) to be received from the first compute node (310) as communications data to be routed around the defective link is part of a receive instruction (938) in a parallel communications library, such as, for example, this receive instruction:

recv(buffer, count, datatype, source, . . . );

This is an example of a receive instruction that receives count elements of data of type 'datatype' into a receive 'buffer' from a 'source.' The 'buffer' parameter is a pointer to the buffer. The 'source' parameter may be a set of x,y,z torus coordinates for a source compute node (for data communications through a torus network) or a tree rank of a source compute node (for data communications through a tree network).

In executing such a send instruction (938), therefore, compute node (312) may identify (918) communications data (920) as communications data to be routed around the defective link (318) by looking up the source in Receive Map Table (912). If a record exists in Receive Map Table (912) having a First_Network_Location (914) value, a set of torus coordinates, equal to the source of a particular receive instruction, then that receive instruction is an instruction to receive communications data across a defective link. The same record of the Receive Map Table (912) also contains a Second_Network_Location field (916) in which is stored the corresponding tree rank in the tree network (108) of the source compute node. The communications data (920) so identified (918) by compute node (312) as communications data to be routed around defective link (318) is the exact same packet of communications data (908) identified (910) by compute node (310) as communications data to be routed around defective link (318).

In the method of FIG. 9 routing communications data around the defective link through a second data communications network also includes receiving (920) by the second compute node the identified communication data (922) through the second data communications network (108) from the location of the first compute node (310) in the second data communications network (108). In this example, receiving (920) by the second compute node the identified communication data (922) through the second data communications network (108) from the location of the first compute node (310) in the second data communications network (108) is carried out by receiving the communications data (922), whose source is the torus coordinates of compute node (310) through defective link (318), from the tree rank of compute node (310) through collective operations adapter (188), (non-defective) tree link (191), and collective operations adapter (926) of tree network (108).

Exemplary embodiments of the present invention are described largely in the context of a fully functional computer system for computer hardware fault administration. Readers of skill in the art will recognize, however, that the present invention also may be embodied in a computer program product disposed on recordable media for use with any suitable data processing system. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of computer hardware fault administration, the method carried out in a parallel computer, the parallel computer comprising a plurality of compute nodes, the compute nodes coupled for data communications by at least two independent data communications networks including a first data communications network and a second data communications network, wherein the first data communication network and the second data communications network have different network topologies, each data communications network comprising data communications links connected to the compute nodes, the method comprising:

identifying a location of a defective link in the first data communications network of the parallel computer;

identifying, in dependence upon the location of the defective link in the first network, a location in the second network of a first compute node connected to the defective link;

identifying, in dependence upon the location of the defective link in the first network, a location in the second network of a second compute node connected to the defective link;

configuring the first compute node with the location in the second network of the second compute node;

configuring the second compute node with the location in the second network of the first compute node; and routing communications data around the defective link from the first computer node directly to the second compute node through the second data communications network of the parallel computer.

2. The method of claim 1 wherein the first data communications network is optimal for collective operations, and the second data communications network is optimal for point to point operations.

3. The method of claim 1 wherein the first data communications network organizes the compute nodes as a tree, and the second data communications network organizes the compute nodes as a torus.

4. The method of claim 1 wherein a first compute node connected to the defective link is configured with a location in the second network of a second compute node connected to the defective link, and routing communications data around the defective link from the first computer node directly to the second compute node through a second data communications network further comprises:
  identifying by the first compute node communications data to be sent to the second compute node as communications data to be routed around the defective link; and
  sending by the first compute node the identified communications data through the second data communications network to the location of the second compute node in the second data communications network.

5. The method of claim 1 wherein a second compute node connected to the defective link is configured with a location in the second network of a first compute node connected to the defective link, and routing communications data around the defective link from the first computer node directly to the second compute node through a second data communications network further comprises:
  identifying by the second compute node communication data to be received from the first compute node as communications data to be routed around the defective link:
  receiving by the second compute node the identified communication data through the second data communications network from the location of the first compute node in the second data communications network.

6. An apparatus for computer hardware fault administration, the apparatus comprising:
  a parallel computer, the parallel computer comprising a plurality of compute nodes, the compute nodes coupled for data communications by at least two independent data communications networks including a first data communications network and a second data communications network, wherein the first data communication network and the second data communications network have different network topologies, each data communications network comprising data communications links connected to the compute nodes,
  the apparatus further comprising a computer processor, a computer memory operatively coupled to the computer processor, the computer memory having disposed within it computer program instructions for;
  identifying a location of a defective link in the first data communications network of the parallel computer;
  identifying, in dependence upon the location of the defective link in the first network, a location in the second network of a first compute node connected to the defective link;
  identifying, in dependence upon the location of the defective link in the first network, a location in the second network of a second compute node connected to the defective link;
  configuring the first compute node with the location in the second network of the second compute node;
  configuring the second compute node with the location in the second network of the first compute node; and
  routing communications data around the defective link from the first computer node directly to the second compute node through the second data communications network of the parallel computer.

7. The apparatus of claim 6 wherein the first data communications network is optimal for collective operations, and the second data communications network is optimal for point to point operations.

8. The apparatus of claim 6 wherein the first data communications network organizes the compute nodes as a tree, and the second data communications network organizes the compute nodes as a torus.

9. The apparatus of claim 6 wherein a first compute node connected to the defective link is configured with a location in the second network of a second compute node connected to the defective link, and routing communications data around the defective link from the first computer node directly to the second compute node through a second data communications network further comprises:
  identifying by the first compute node communications data to be sent to the second compute node as communications data to be routed around the defective link; and
  sending by the first compute node the identified communications data through the second data communications network to the location of the second compute node in the second data communications network.

10. The apparatus of claim 6 wherein a second compute node connected to the defective link is configured with a location in the second network of a first compute node connected to the defective link, and routing communications data around the defective link from the first computer node directly to the second compute node through a second data communications network further comprises:
  identifying by the second compute node communication data to be received from the first compute node as communications data to be routed around the defective link;
  receiving by the second compute node the identified communication data through the second data communications network from the location of the first compute node in the second data communications network.

11. A computer program product for computer hardware fault administration in a parallel computer, the parallel computer comprising a plurality of compute nodes, the compute nodes coupled for data communications by at least two independent data communications networks including a first data communications network and a second data communications network, each data communications network comprising data communications links connected to the compute nodes, the computer program product disposed upon a non-transitory recordable media, the computer program product comprising computer program instructions for: identifying a location of a defective link in the first data communications network of the parallel computer; identifying in dependence upon the location of the defective link in the first network, a location in the second network of a first compute node connected to the defective link identifying, in dependence upon the location of the defective link in the first network, a location in the second network of a second compute node connected to the defective link; configuring the first compute node with the location in the second network of the second compute node; configuring the second compute node with the location in the second network of the first compute node; and muting communications data around the defective link through the second data communications network of the parallel computer.

12. The computer program product of claim 11 wherein the first data communications network is optimal for collective operations, and the second data communications network is optimal for point to point operations.

13. The computer program product of claim 11 wherein the first data communications network organizes the compute nodes as a tree, and the second data communications network organizes the compute nodes as a torus.

14. The computer program product of claim 11 wherein a first compute node connected to the defective link is configured with a location in the second network of a second compute node connected to the defective link, and routing communications data around the defective link from the first computer node directly to the second compute node through a second data communications network further comprises:
   identifying by the first compute node communications data to be sent to the second compute node as communications data to be routed around the defective link; and
   sending by the first compute node the identified communications data through the second data communications network to the location of the second compute node in the second data communications network.

15. The computer program product of claim 11 wherein a second compute node connected to the defective link is configured with a location in the second network of a first compute node connected to the defective link, and routing communications data around the defective link from the first computer node directly to the second compute node through a second data communications network further comprises:
   identifying by the second compute node communication data to be received from the first compute node as communications data to be routed around the defective link;
   receiving by the second compute node the identified communication data through the second data communications network from the location of the first compute node in the second data communications network.

* * * * *